(12) United States Patent
Fujino et al.

(10) Patent No.: US 6,233,370 B1
(45) Date of Patent: May 15, 2001

(54) INTERFERENCE MEASUREMENT APPARATUS AND PROBE USED FOR INTERFERENCE MEASUREMENT APPARATUS

(75) Inventors: Makoto Fujino; Nobuo Hori; Shigenori Nagano, all of Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 0 days.

(21) Appl. No.: 09/182,504

(22) Filed: Oct. 30, 1998

(30) Foreign Application Priority Data

Oct. 31, 1997 (JP) .................................................. 9-314586

(51) Int. Cl.$^7$ .................................. G02B 6/00; G01J 4/00
(52) U.S. Cl. ......................................... 385/11; 385/3; 385/8
(58) Field of Search .................................. 385/1–3, 8, 11

(56) References Cited

U.S. PATENT DOCUMENTS

| | | | |
|---|---|---|---|
| 4,691,984 | * 9/1987 | Thaniyavarn | 385/8 |
| 4,909,629 | 3/1990 | Yokokura et al. | 356/358 |
| 4,941,744 | * 7/1990 | Yokokura et al. | 356/358 |
| 5,493,395 | * 2/1996 | Otsuka | 356/349 |
| 5,867,615 | * 2/1999 | Shi | 385/3 |

FOREIGN PATENT DOCUMENTS

| | | |
|---|---|---|
| 64-12205 | 1/1989 | (JP) . |
| 64-88202 | 4/1989 | (JP) . |

\* cited by examiner

*Primary Examiner*—John D. Lee
*Assistant Examiner*—Sarah N Song
(74) *Attorney, Agent, or Firm*—Foley & Lardner

(57) ABSTRACT

An simlified optical configuration is acheved and, a direction discrimination function and a high resolving detection function are performed by one light receiving section. A TE mode emitted from an optical waveguide section 3 transmits through a beam splitter 5 and is guided to a measurement optical path. A TM mode emitted from the optical waveguide is reflected by the beam splitter 5 and is guided to a reference optical path. First and second ¼ wave plates 10 and 11 are inserted in the respective optical paths, and the TE and TM modes are acted by a ½ wave plate while travelling forward and backward on the reference and measurement optical paths. A reference light (TM mode) is reflected by a reference reflection section 8 and transmits through the beam splitter section 5. A measurement light (TE mode) is reflected by a measurement reflection section 9 and is reflected by the beam splitter section 5. By a polarization member 12, only direction components of the polarization member 12 are extracted from the TM and TE modes, and both waves interfere, whereby a displacement is measured by a displacement measurement section 7.

20 Claims, 10 Drawing Sheets

IV-IV

IV'-IV'

IV"-IV"

DIRECTION OF PORALIZATION MEMBER

INTERFERENCE MEASUREMENT APPARATUS AND PROBE USED FOR INTERFERENCE MEASUREMENT APPARATUS

BACKGROUND OF THE INVENTION

The present invention relates to an interference measurement apparatus and a probe used for an interference measurement apparatus, more particularly, to an interference measurement apparatus and a probe used for an interference measurement apparatus which utilize a phase modulation method.

FIG. 11 shows a constitutional view of a conventional interference measurement apparatus (see the Publication of Unexamined Japanese Patent Application No. 64-88202).

This interference measurement apparatus comprises a light source instrument 111, a half mirror 113, a movement corner cube 114, a reference corner cube 115, a polarization beam splitter 116, detectors 117 and 118, and a signal processing circuit.

In such interference measurement apparatus, a luminous flux P emitted from the light source instrument 111 is divided into the measurement luminous fluxes P1 and P2 by the half mirror 113 as the beam splitter. The measurement luminous flux P1 is reflected by the movement corner cube 114 serving as a reflection means disposed at a measurement position on the measurement optical path. The reference light P2 is reflected by the reference corner cube 115 disposed on the reference optical path. The interference light P3 of both luminous fluxes is guided to the polarization beam splitter 116 and is separated into the P and S components by the polarization beam splitter 116. The interference light of the P component is guided to the detector 117, and the interference light of the S component is guided to the detector 118. In accordance with the interference state based on the movement of the movement corner cube 114, the interference signals Q1 and Q2 shifted by 90° from each other are inputted to the signal processing circuit from the detectors 117 and 118, and subjected to a predetermined signal processing by the signal processing circuit, so that the distance to the movement corner cube 114 is measured.

Next, a second background known art will be described.

FIG. 12 shows a conventional bulk type phase modulation interference measurement apparatus (see the Publication of Unexamined Japanese Patent Application No. 64-12205).

In this apparatus, the coherent light P emitted from a laser light source 121 is split into a reference light P1 and a measurement light P2, and the reference light P1 is reflected by a reference prism 123. The measurement light P2 is reflected by a measurement prism 124, and the returned reference light P1 and the returned measurement light P2 are allowed to interfere with each other and the interfered light is guided to a photodetector 125. Here, a measurement prism 124 is moved to the arrow direction or to opposite direction to the arrow, and the reference prism 123 is vibrated with a predetermined period as shown by the arrow. The difference of the optical distance of the reference light P1 from that of the measurement light P2 is relatively changed with the predetermined period, and the interference signal based on the interference light which changes in response to the change of that difference is obtained by the photodetector 125. In the manner described above, the direction of the phase change of the measurement light (movement direction of the measurement prism 124) can be obtained, the movement amount of the measurement prism 124 can be obtained without an influence of the DC bias component based on the light amount or the like.

However, in the first conventional background art, the structure of the optical system is complicated. In the second conventional background art, a driving section for mechanically driving the reference prism is necessary, so, the structure of the control system is complicated. Moreover, in the first and second conventional background arts, since the prism is used as the reflection mirror, the range of use is limited by the size of the prism itself and an axial shift may occur, and it is hard to handle it.

SUMMARY OF THE INVENTION

From the viewpoint of the above described circumstances, the object of the present invention is, by adopting a phase modulating method, to make an optical system simplified and to perform signal processing for a direction discrimination function and a high resolving detection function by one light receiving section.

The present invention achieves a phase modulation system having no mechanical driving section by adopting phase modulation method in a waveguide device type. Moreover, the object of the present invention is to simplify a waveguide pattern so as to fit to mass production, by forming two signals having different phases only with one waveguide.

Another object of the present invention is, by adopting a push-pull type phase modulation method, to reduce an applied voltage to approximately half and to make a voltage amplitude at the time of modulation small, thereby achieving a low power consumption type apparatus. Moreover, the object of the present invention is to provide an apparatus in which a detection precision of the displacement is not influenced by a manufacturing error of a wave plate.

In a first embodiment of the present invention, the object of the present invention is to make it easy to handle an apparatus by adopting a plane mirror as a reflection mirror and to lessen an axis shift. Moreover, the object of the present invention is to provide an interference measurement apparatus which can be easily applied to a bi-axial displacement positioning sensing system by a L-character mirror.

According to the present invention, provided is an interference measurement apparatus comprising:

a light source section for supplying a linearly polarized light;

an optical waveguide section having a phase modulation section provided therein, which gives different phases to TM and TE modes of a incidence luminous flux by a predetermined modulation frequency, the optical waveguide section receiving a luminous flux from the light source section and emitting a phase modulation luminous flux;

a beam splitter section which separates the phase modulation luminous flux subjected to the phase modulation by the optical waveguide section into a measurement luminous flux and a reference luminous flux depending on each polarization direction, and allows the measurement luminous flux to travel to a measurement optical path where a measurement objective is arranged as well as the reference luminous flux to travel to a reference optical path where reference reflection section is arranged;

a light receiving section which receives an interference luminous flux obtained by interfering the reference luminous flux and the measurement luminous flux, the reference luminous flux returning from the reference optical path via the beam splitter section and the measurement luminous flux returning from the measurement optical path via the beam splitter section; and a displacement measurement section which extracts a frequency component, phases of which are shifted by 90° each other, from the light receiving section, and measures a displacement of the objective based on the extracted signal.

According to the present invention, provided is a probe used for an interference measurement apparatus comprising an optical waveguide module, the optical waveguide module including:

an incidence terminal for receiving a linearly polarized light;

a phase modulation section which gives different phases to TM and TE modes of the linearly polarized light by a predetermined modulation frequency;

an emission terminal which emits a phase modulation luminous flux; and an optical waveguide having the incidence terminal and the emission terminal, wherein the optical waveguide module is formed of a substrate exhibiting an electro-optic effect, which receives a linearly polarized light so that a polarization direction thereof is approximately 45° relative to a surface of the substrate, and a signal for a predetermined frequency is applied to the phase modulation section of the optical waveguide module, thereby allowing the TM and TE modes of the linearly polarized light to perform phase changes of approximately the equal amplitude and opposite signs to each other.

BRIEF DESCRIPTION OF THE DRAWINGS

For a more complete understanding of the present invention and the advantages thereof, reference is now made to the following description taken in conjunction with the accompanying drawings.

Figure 1:
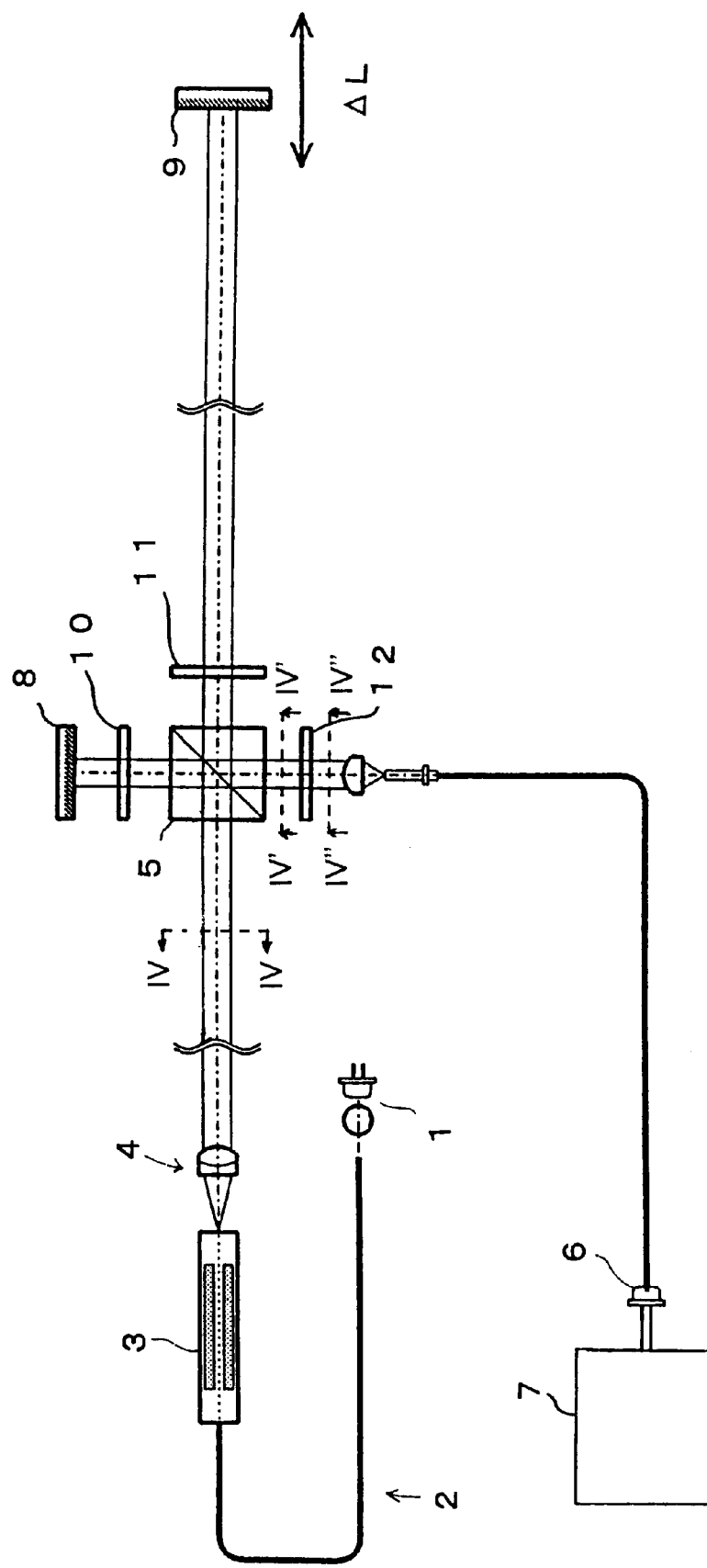
FIG. 1 is a constitutional view of a first embodiment of an interference measurement apparatus of the present invention.

DETAILED DESCRIPTION OF THE PREFERRED EMBODIMENTS (1) A First Embodiment of the Interference Measurement Apparatus In FIG. 1, a constitutional view of a first embodiment of an interference measurement apparatus of the present invention is shown.

As shown in FIG. 1, the interference measurement apparatus comprises, a light source section 1, a connection section 2, an optical waveguide section (optical waveguide module) 3, an irradiation section 4, a polarization beam splitter section 5, a light receiving section 6, a displacement measurement section 7, a reference reflection section 8 and a measurement reflection section 9. Moreover, this interference measurement apparatus further comprises first and second ¼ wave plates 10 and 11 and a polarization member 12. In regard to the probe used for an interference measurement, provided are the light source section 1, the connection section 2, the optical waveguide section 3, and the irradiation section 4.

The light source section 1 is composed of, for example, a laser diode or the like, which supplies a coherent light. The light source section 1 can be provided so as to separate from the optical waveguide section (optical waveguide module) 3. For example, the optical waveguide 3 is disposed in a small space and the light source section 1 is disposed in another wide place, whereby measurement at a small space is possible. The connection section 2 is composed of means for allowing a laser light from the light source section 1 to be directly input to the optical waveguide section 3, for example, by a fiber for maintaining a polarization surface such as a polarization surface retention type single mode fiber and by a collective lens and a polarizer. As for the fiber for maintaining a polarization surface, a single polarization fiber keeping a linear polarization surface, a coil type fiber polarizer using a coil fiber, and a bulk type fiber polarizer combined with a rod lens and a polarizer can be used. Means for inputting the laser light from the light source section 1 to the optical fiber via a rod lens etc. may be provided. The connection section 2 supplies the laser light emitted from the light source section 1 to the optical waveguide section 3, and the laser light is incident into the optical waveguide section 3 so that the polarization direction of the linearly polarized light is approximately 45° relative to the surface of the substrate. It should be noted that, where a laser emitting a random polarized light is used as the light source section 1, it can also be constituted by converting the random polarized light to a linearly polarized light with a polarizer etc.

The optical waveguide section 3 is constituted of a substrate exhibiting an electro-optic effect such as a lithium niobate crystal substrate or a lithium tantalate crystal substrate. In the optical waveguide section 3, one straight optical waveguide of X-cut type or Z-propagation type is formed, and a pair of electrodes for modulating in the Y-direction is disposed close to this optical waveguide as the phase modulation section. A phase modulation signal such as a sine wave signal of a predetermined frequency is applied to the electrodes, and a phase changes of approximately opposite sign is given to the TM and TE modes of the incidence luminous flux.

The irradiation section 4 is composed of a collimator lens or the like. The luminous flux emitted from the optical waveguide section 3 is converted to a parallel luminous flux having an appropriate beam diameter by the irradiation section 4. The polarization beam splitter 5 is composed of a polarization beam splitter or the like, which allows the P and S waves to pass therethrough or reflect therefrom.

The light receiving section 6 is constituted by appropriately using a collective lens, a ferrule, an optical fiber and the photodetector etc. The light receiving section 6 may be constructed in a constitution in which, in accordance with the amount of the received light, the collective lens is omitted or the optical fiber is omitted. The displacement measurement section 7 is constituted by a signal processing processor or the like, which obtains the displacement of the objective to be measured based on the signal received by the light receiving section 6. The reference reflection section 8 and the measurement reflection section 9 are constituted by, for example, a plane mirror.

Next, an example of manufacturing steps of the optical waveguide is shown in FIGS. 2A to 2D.

Figure 2A:
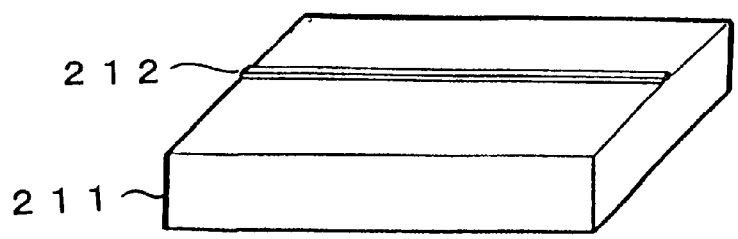
FIGS. 2A to 2D shows manufacturing steps of an optical waveguide section.
Figure 2B:
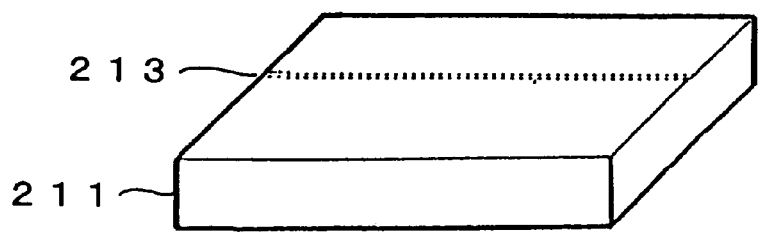
Figure 2C:
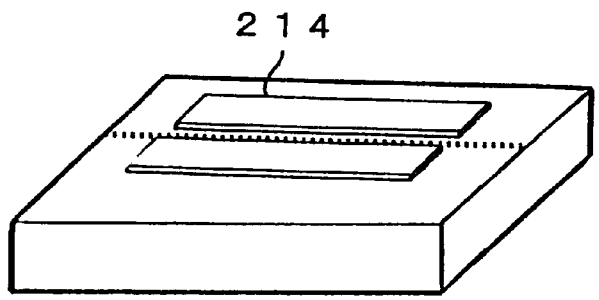

First, as shown in FIG. 2A, using a photolithography technique a metal 212 (for example, Ti) is deposited on the surface of the single crystal substrate 211 (for example, $LiNbO_3$) so as to form a desired waveguide pattern shape. Subsequently, as shown in FIG. 2B, the single crystal substrate 211 is heated by an electric furnace or the like, whereby the metal 212 is thermally diffused into the substrate 211. As a result, the buried type waveguide 213 having a pattern shape is formed. Moreover, after the formation of the waveguide 213, as shown in FIG. 2C, the optical control electrode 214 is formed at a desired position. A metal material exhibiting a good electrical conductivity is employed as the material of the optical control electrode 214, and generally, for example, gold (Au) exhibiting stability with time is used by deposition.

Figure 2D:
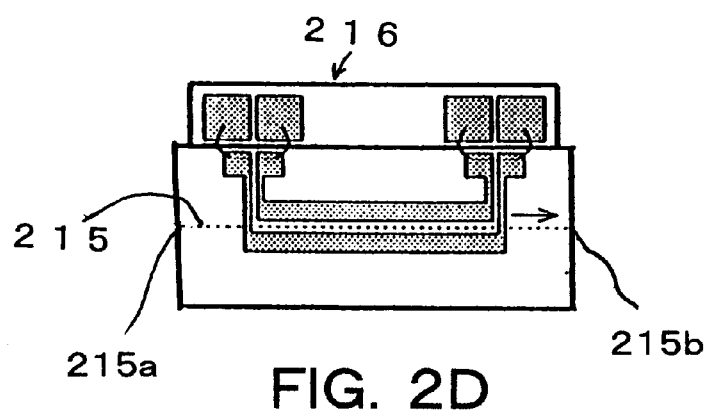

Thus, as shown in FIG. 2D, the waveguide 215 and the modulation section 216 which performs a phase modulation in the waveguide 215 can be formed. A coherent light from the light source section 1 is incident into the waveguide 215 from the incidence terminal 215a thereof. After the coherent light is modulated, it is emitted from the emission terminal 215b of the waveguide 215.

Figure 3:
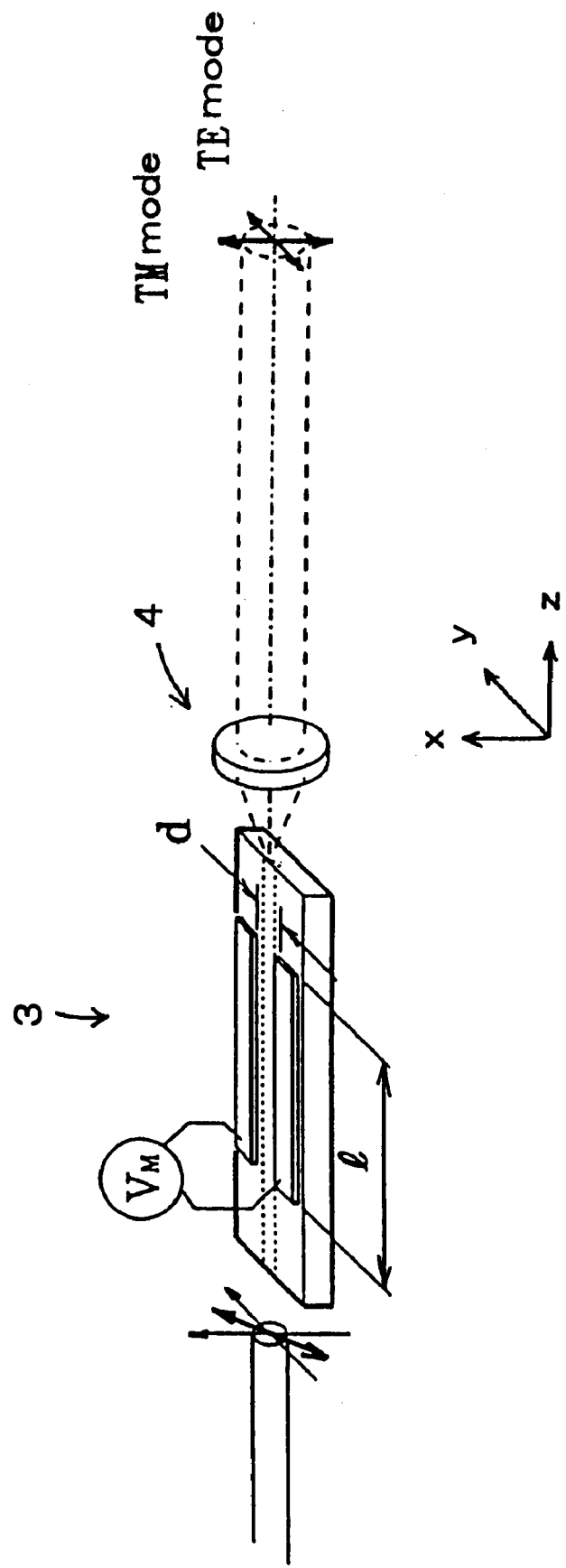
FIG. 3 is an explanatory view for explaining an operation of a probe used for an interference measurement apparatus.

In FIG. 3, an explanatory view of an operation of a probe used for the interference measurement apparatus is shown.

Into the optical waveguide 3, incident is a linearly polarized light inclining by about 45° relative thereto. Here, the modulation electrodes provided in the straight waveguide have a length of l and an interval of d. The phase modulation signal $V_M$ is applied to the electrodes. The luminous flux emitted travels through the collimator lens of the irradiation section 4 and has components of the TM and TE modes, each having a polarization surface which intersects with another. The x, y and z-directions are as shown in FIG. 3. By applying a predetermined phase modulation signal $V_M$, the polarization surface of each mode undergoes the phase modulation according to the generated electric field and its direction.

Next, an operation of the interference measurement apparatus will be described.

Figure 4A:
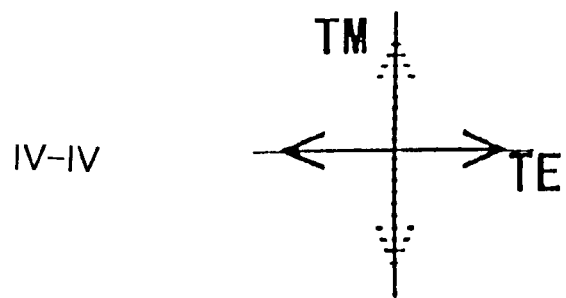
FIGS. 4A to 4C are views showing a principle of an operation of a superposition and an interference in TM and TE modes.
Figure 4B:
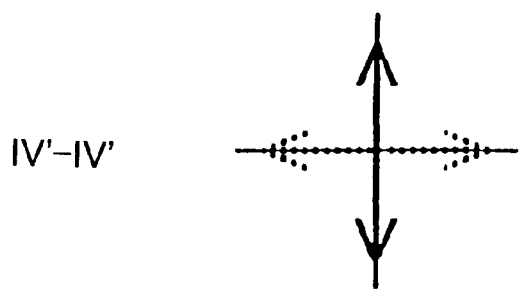
Figure 4C:
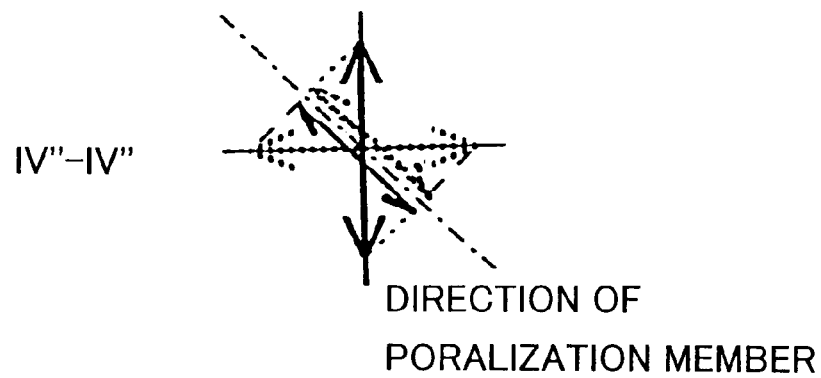

In FIGS. 4A to 4C, a view of an operational principle of superposition and interference of the TM and TE modes. In FIGS. 4A 4B and 4C, the behavior of a polarized light is from the sections taken on lines IV—IV, IV'—IV' and IV"—IV" of FIG. 1, respectively.

The TM and TE modes emitted from the optical waveguide 3 are shown as illustrated in FIG. 4A. Since the TE mode emitted from the optical waveguide 3 is the component of a P waveform for the polarization beam splitter section 5, it passes through the splitter 5 and is guided to the measurement optical path. Since the TM mode emitted from the optical waveguide is the component of a S wave for the polarization beam splitter 5, it is reflected by the splitter 5 and is guided to the reference optical path. In the respective optical paths, the first and second ¼ wave plates 10 and 11 are inserted between the beam splitter section 5 and the reflection plane mirror, and each polarization light passes through these ¼ wave plates twice forward and backward, so that the first and second ¼ wave plates 10 and 11 act on each polarization light as a ½ wave plate. Consequently, the reference light (TM mode) is reflected by the reference reflection section 8, and the reference light becomes the P component (TE mode) from the S component and returns to the polarization beam splitter section 5, thereby passing through the polarization beam splitter section 5. On the other hand, the measurement light (TE mode) is reflected by the measurement reflection section 9, and becomes the S component (TM mode) from the P component and then returns to the polarization beam splitter 5 again, so that it is reflected by the polarization beam splitter section 5.

Therefore, as shown in FIG. 4B, the two polarized lights are guided to the light receiving section 6 without returning to the incidence direction. Here, the polarization surfaces of the polarized lights however do not interfere with each other. Then, the polarization direction of the polarization member 12 is set to the direction in which both components of the TM and TE modes are included, for example, in the intermediate direction between the TM and TE modes. Thus, as shown in FIG. 4C, since the polarized lights are arranged in the same polarization direction, both polarization lights interfere for the first time after passing through the polarization member 12.

Figure 5:
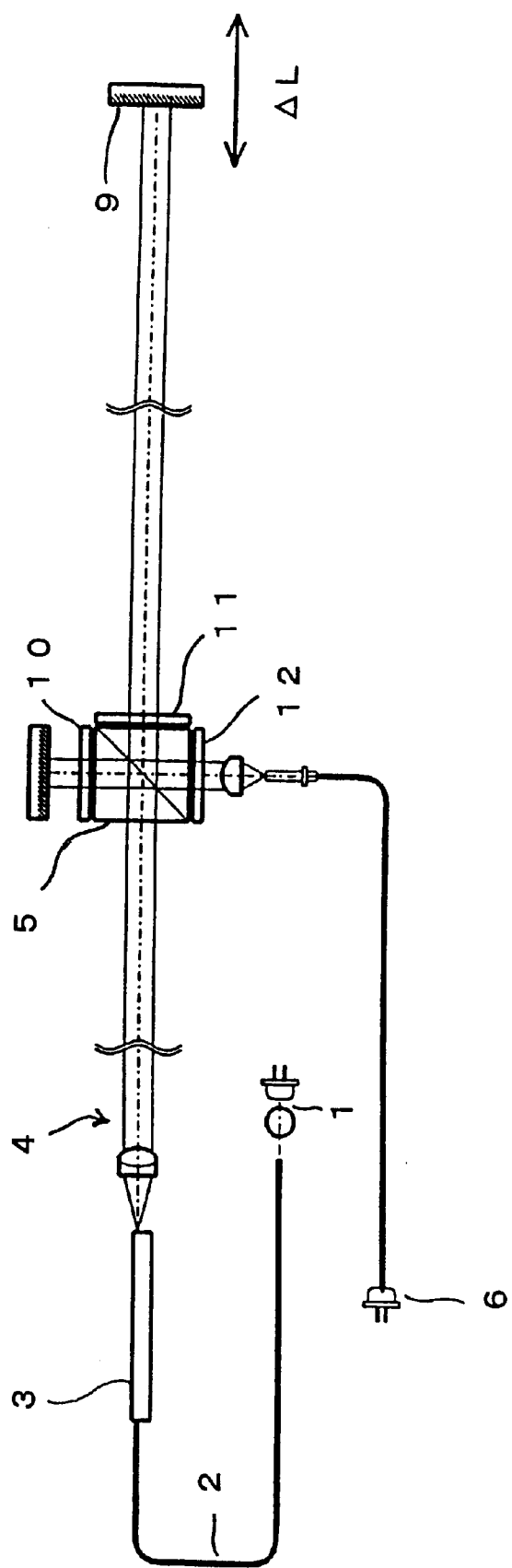
FIG. 5 is a constitutional view of a modification of the first embodiment of the interference measurement apparatus of the present invention.

Next, in FIG. 5, a constitutional view of a modification of the first embodiment of the interference measurement apparatus according to the present invention is shown.

In this modification, with respect to the direction of the optical waveguide section 3, its device surface is disposed perpendicular to the paper plane. Also in this case, though the optical paths on which the TM and TE modes advance are opposite, the same operation as the above is performed.

(2) Operation Principle of the Interference Measurement Apparatus

Next, the operation principle of the interference measurement apparatus will be described.

Figure 6:
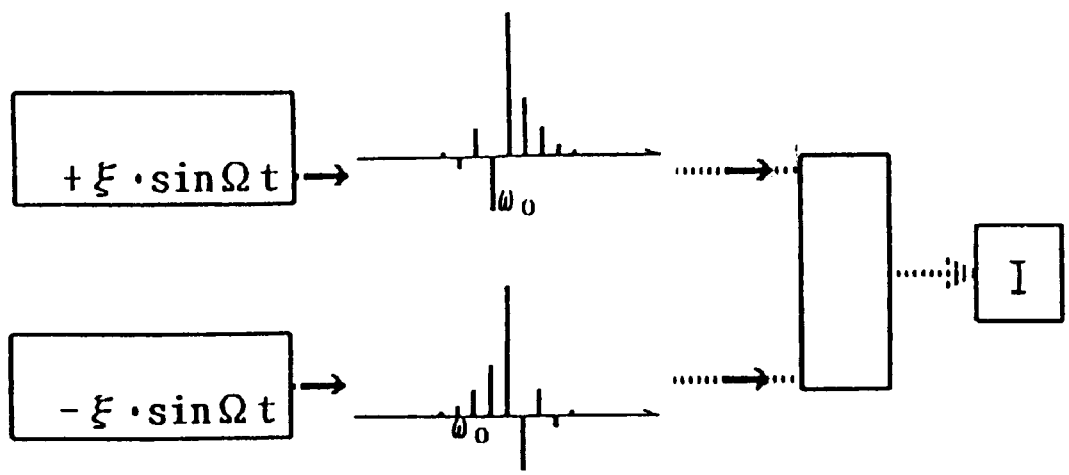
FIG. 6 is an explanatory view of an interference of a push-pull type phase modulation method.

In FIG. 6, an explanatory view for the interference of a push-pull type phase modulation method is shown. The operation principle will be described with reference to this drawing.

The modulation operation of the optical waveguide section 3 is performed by utilizing a Pockels effect of the $LiNbO_3$ single crystal substrate. In the X-cut and Z-propagation type waveguide, a change of a refractive index in the case where a voltage is applied to the Y-direction is expressed by the following expression 1.

$$n_X \equiv n_o + \Delta n_X = n_o - (1/2) \cdot n_o^3 r_{22}\left(\frac{V}{d}\right)$$

$$n_Y \equiv n_o + \Delta n_Y = n_o + (1/2) \cdot n_o^3 r_{22}\left(\frac{V}{d}\right)$$

where $r_{22}$ is a Pockels effect of the $LiNbO_3$ single crystal substrate, d is the interval between the electrodes of the waveguide, $\Omega$ is the modulation angular frequency, V is the applied voltage, and l is the electrode length of the waveguide.

Therefore, when the voltage in the form of the following sine wave is applied, the phases of the polarized light in the X and Y-directions are expressed by the following expression 2.

$$V = V_o \cdot \sin(2x \cdot f_M t) = V_o \cdot \sin(\Omega t)$$

$$\phi_X = \frac{2\pi}{\lambda} n_X l = \frac{2\pi}{\lambda} l(n_o + \Delta n_X) \equiv \phi_o + \Delta\phi_X$$

$$\phi_Y = \frac{2\pi}{\lambda} n_Y l = \frac{2\pi}{\lambda} l(n_o + \Delta n_Y) \equiv \phi_o + \Delta\phi_Y$$

Here, l is the electrode length of waveguide.

Therefore, the phase changes f the polarized lights in the X and Y-directions are expressed by the following expression 3.

$$\Delta\phi_X = -\frac{1}{2} \frac{2\pi}{\lambda} l \cdot n_o^3 r_{22}\left(\frac{1}{d}\right) \cdot V_o \sin(\Omega t) \equiv -\xi \sin(\Omega t)$$

$$\Delta\phi_Y = +\frac{1}{2} \frac{2\pi}{\lambda} l \cdot n_o^3 r_{22}\left(\frac{1}{d}\right) \cdot V_o \sin(\Omega t) \equiv +\xi \sin(\Omega t)$$

As described above, the feature of the push-pull type phase modulation method is that the phases of the polarized lights in the X and Y-directions change taking an opposite sign with the same amplitude.

As described above, the reference wave $U_R$ reflected from the fixed mirror of the reference reflection section 8 is expressed by the following expression 4.

$$U_R = E_R \exp[-i\{\omega_o t - \phi_o + \xi \cdot \sin\Omega t\}]$$

$$= E_R \cdot \exp[+i\phi_o] \sum_{n=-\infty}^{n=+\infty} J_n(\xi) \cdot \exp[-i\{\omega_o + n \cdot \Omega\}t]$$

On the other hand, with respect to the measurement wave $U_M$ reflected from the moving mirror of the measurement reflection section 9, the phase difference $\Delta\Phi = 2 \cdot k\Delta L$ due to the movement amount $\Delta L$ of the moving mirror is added and the measurement wave $U_M$ is expressed by the following expression 5.

$$U_M = E_M \exp[-i\{\omega_o t - \phi_o - \xi \cdot \sin\Omega t\}] \exp[+i2k_o \Delta L]$$

$$U_M = E_M \cdot \exp[+i\phi_o]\exp[+i2k_o \Delta L] \sum_{n=-\infty}^{n=+\infty} J_n(\xi) \cdot \exp[-i\{\omega_o - n \cdot Q\}t]$$

The interference light I obtained by allowing these two polarized lights to superpose upon another and to interfere with each other is obtained as expressed by the following expression 6.

$$I = \{U_R + U_M\}\{U_R + U_M\}^*$$

When the calculation for the expression 6 is made, the fundamental wave component $I(\Omega)$ and the double wave component $I(2\Omega)$ are expressed by the following expression 7.

$$I(\Omega) \approx 8 \cdot J_0(\xi) J_1(\xi) E_R E_M^* \sin(2 \cdot k_o \Delta L)$$

$$I(2\Omega) \approx 8 \cdot \{J_0(\xi) J_2(\xi) + J_1(\xi)^2\} E_R E_M^* \cos(2 \cdot k_o \Delta L)$$

Therefore, in the push-pull type phase modulation method, the phase difference for the displacement amount of the mirror is $\pi/2$, thereby enabling a direction discrimination function.

Next, in the displacement measurement section 7, the displacement is measured based on the fundamental wave component $I(\Omega)$ and the double wave component $I(2\Omega)$.

Figure 7:
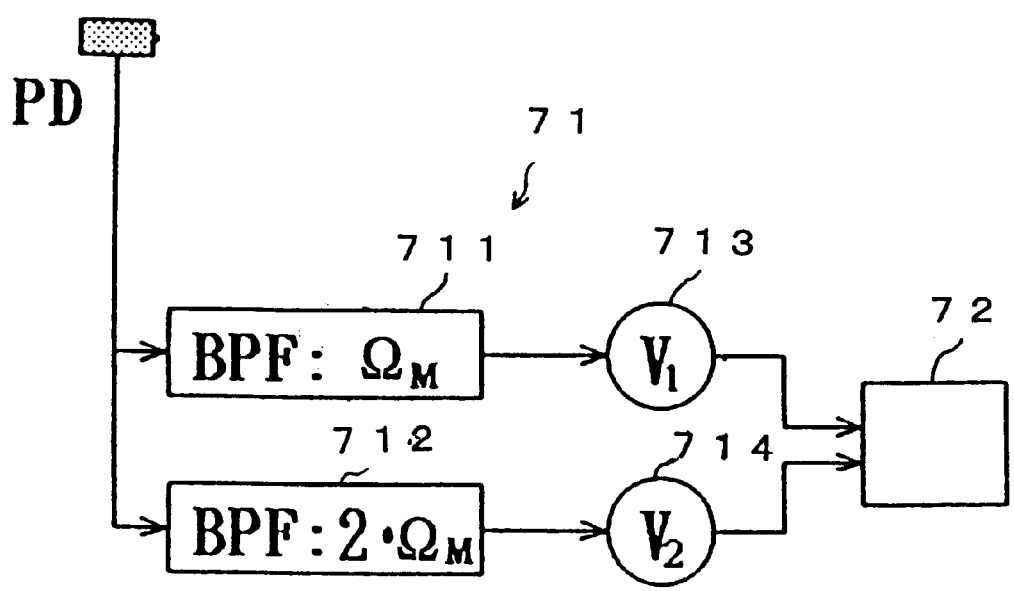
FIG. 7 is a constitutional view of a displacement measurement section.

In FIG. 7, the constitutional view of the displacement measurement section is shown.

The displacement measurement section 7 comprises a signal extraction section 71 and a displacement calculation section 72. The signal extraction section 71 extracts the fundamental wave signal of a frequency equal to the modulation frequency of the phase modulation section and the fundamental wave signal of a frequency twice that of the double wave signal. Specifically, the fundamental wave component $I(\Omega)$ and the double wave component $I(2\Omega)$ are extracted by band pass filters 711 and 712 and detection circuits 713 and 714. From the phase of the signal extracted by the signal extraction section 71, the displacement calculation section 72 obtains the displacement of the objective to be measured in expression 8 as follows, $$\Delta L = \lambda/2 \cdot (N + \Delta\Phi/2\pi)$$

where N is an integer, which is a count number corresponding to each change of $\frac{1}{2}\lambda$ of the displacement amount. $\Delta\Phi$ is a fraction number of the phase displacement within $2\pi$.

Next, the formation of a Lissajous circle by the amplitude values of the reference and measurement lights will be described.

Figure 8:
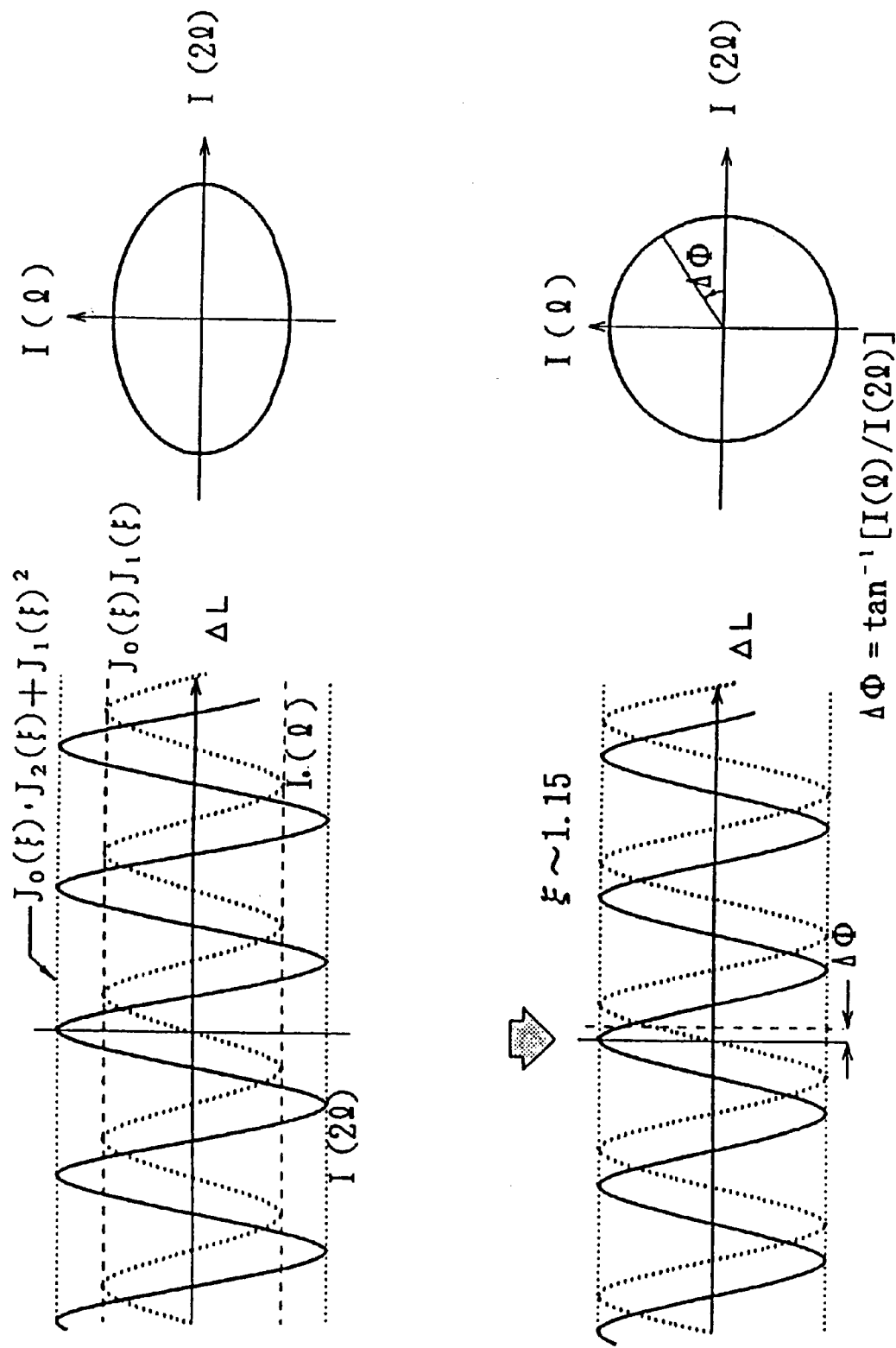
FIG. 8 is an explanatory view of an amplitude adjustment of a phase modulation.

In FIG. 8, an explanatory view concerning the amplitude adjustment of the phase modulation is shown.

As shown in FIG. 8, the Lissajous circle is formed by the amplitude of the voltage applied to the phase modulation section. In this case, it is implied that the phase amplitude adjustment was done. For example, in the expressions described above, when the following condition of expression 9 is established, the Lassajous circle is formed.

$$J_0(\xi) J_1(\xi) \approx J_0(\xi) J_2(\xi) + J_1(\xi)^2$$

As described above, generally, in the interference measurement apparatus, when the reference and measurement lights interfere, it is desirable that the intensities of both lights be equal. For example, in the case where the polarization direction of the linearly polarized light supplied from the light source section 1 is 45°, the intensities of both of the reference and measurement lights can be made equal by setting the direction of the polarization member to obliquely about 45°. In the case where the polarization direction of the linearly polarized light supplied from the light source section 1 is not always 45°, it is unnecessary to dispose the polarization member 12 at 45°, and the intensities of both lights can appropriately be adjusted. Moreover, an appropriate adjustment is possible so that the TM and TE modes of the phase modulation luminous flux modulated (or, the polarized light on the substrate surface and polarized light on the surface perpendicular to the substrate surface) have approximately the same amplitude. Specifically, for example, by appropriately setting the refractive index of the substrate of the optical waveguide section 3, the dimension or interval of a pair of electrodes of the phase modulation section disposed near to the waveguide of the optical waveguide section 3, the voltage applied to the phase modulation section, or these combination, the adjustment is possible.

(3) A Second Embodiment of the Interference Measurement Apparatus

Figure 9:
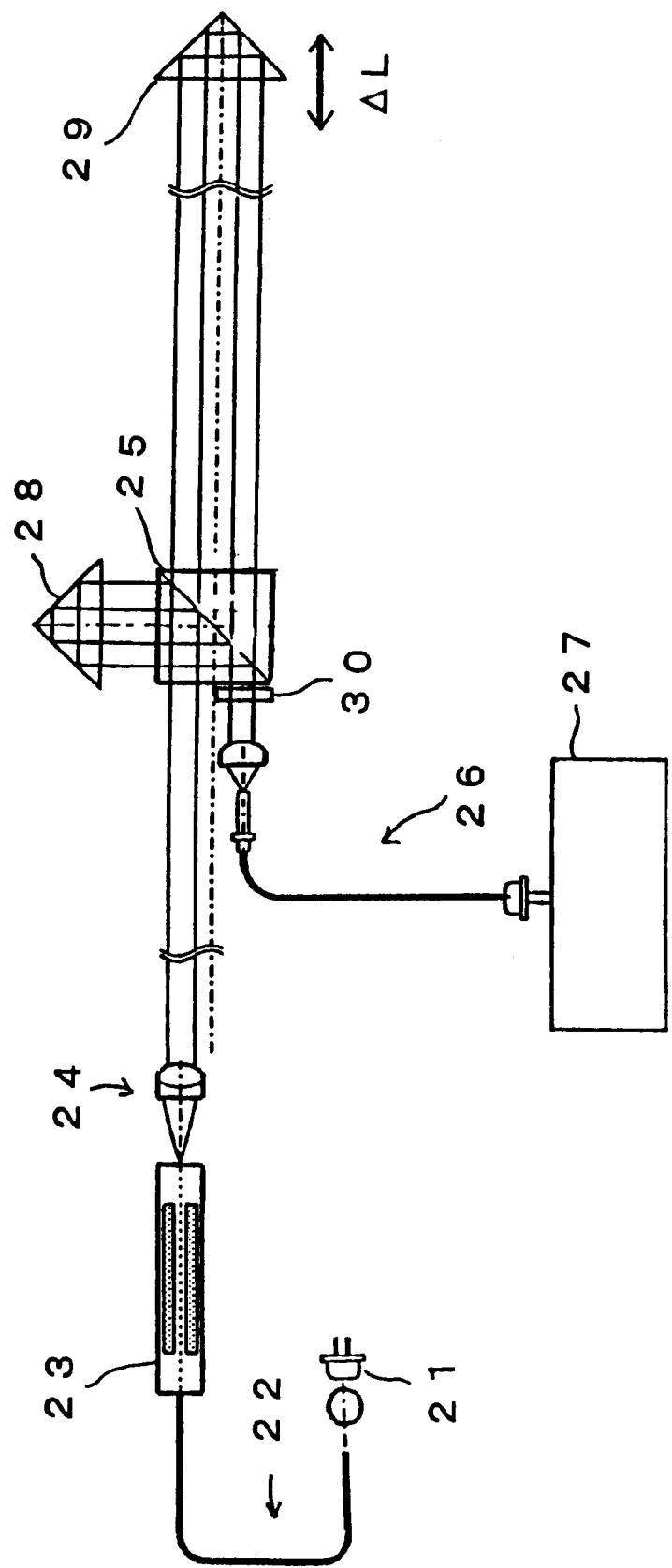
FIG. 9 is a constitutional view of a second embodiment of the interference measurement apparatus of the present invention.

In FIG. 9, a constitutional view of a second embodiment of the interference apparatus according to the present invention is shown.

Referring to FIG. 9, the interference measurement apparatus comprises a light source section 21, a connection section 22, an optical waveguide section 23, an irradiation section 24, a polarization beam splitter section 25, a light receiving section 26, a displacement measurement section 27, a reference reflection section 28, a measurement reflection section 29 and a polarization member 30. Moreover, in regard to the probe used for the interference measurement, the light source section 21, the connection section 22, the optical waveguide section 23; and the irradiation section 24 are provided, similar to the first embodiment. The constitutions of the polarization beam splitter section 25, the light receiving section 26, the displacement measurement section 27 and the polarization member 30 are similar to those of the first embodiment.

In the second embodiment, the reference reflection section 28 and the measurement reflection section 29 are constituted by a corner cube, a cube corner prism (CCP) or the like, and a ¼ wave plate is not provided. Moreover, the light receiving section 26 and the polarization member 30 are disposed as is shown in FIG. 9.

Next, an operation of the interference measurement apparatus will be described.

The TE and TM modes are emitted from the optical waveguide section 23 via the irradiation section 24. Since the TE mode emitted from the optical waveguide section 23 is the P waveform component for the polarization beam splitter section 25, it transmits through the polarization beam splitter 25 and is guided to the measurement optical path. Since the TM mode emitted from the optical waveguide section 23 is the S wave component for the polarization beam splitter section 25, it is reflected and guided to the reference optical path. Next, the reference light (TM mode) is reflected by the reference reflection section 28, and returns to the polarization beam splitter section 25 while keeping its state of the S wave component intact, so that the reference light is reflected by the polarization beam splitter 25. On the other hand, the measurement light (TE mode) is reflected by the measurement reflection section 29, and returns to the polarization beam splitter section 25 while keeping its state of the P component intact, so that the measurement light transmits through the polarization beam splitter section 25.

Since the reference reflection section 28 and the measurement reflection section 29 are constituted by the corner cube or the like, the returned reference and measurement lights shift from each other in parallel while traveling back and forth, so that these two polarized lights never return toward the incidence direction and are guided to the light receiving section 26. Note that since the polarization surfaces of both polarized lights intersect at a right angle, the two polarized lights do not interfere. By setting the polarization direction of the polarization member 30 to approximately the intermediate direction between the TM and TE modes, the direction component of the polarization member 30 is extracted from the TM and TE modes. Thus, the two polarized lights are arranged in the same polarization direction, so that the both waves interfere for the first time after passing through the polarization member 30.

An operation principle of the second embodiment is similar to that of the first embodiment. Moreover, the optical waveguide section 23 can be also disposed as the modification of the first embodiment.

(4) A System Constitution of the Interference Measurement Apparatus

Figure 10:
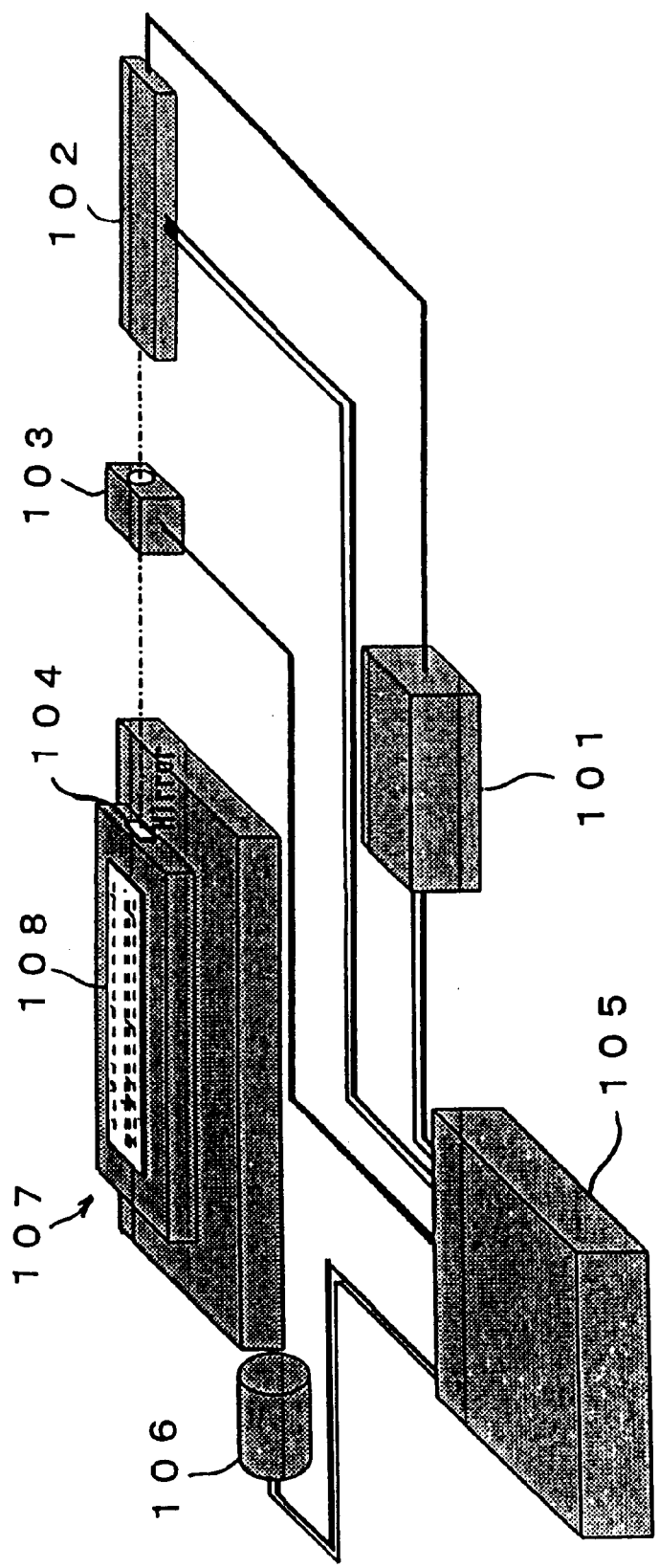
FIG. 10 is a constitutional view showing a system of the interference measurement apparatus.
Figure 11:
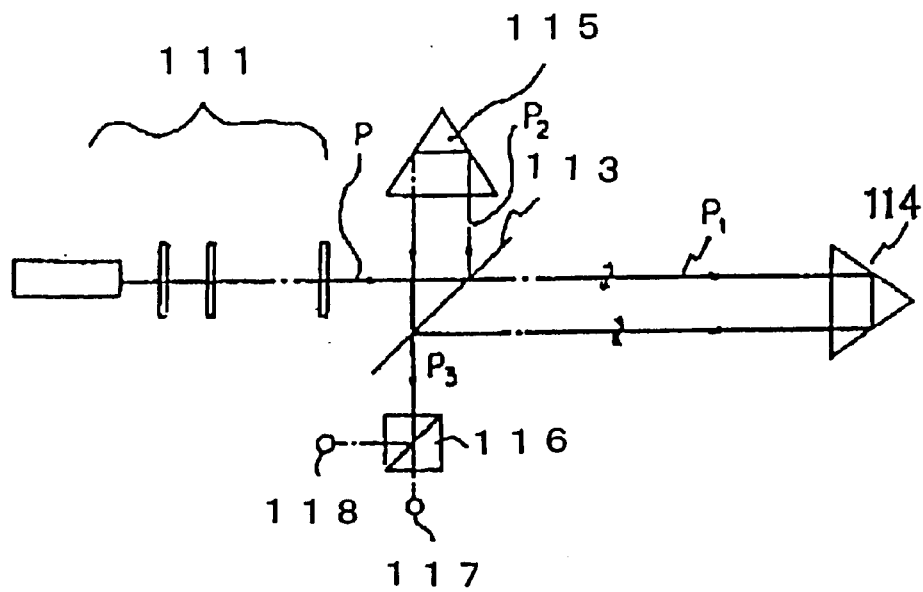
FIG. 11 is a constitutional view of a conventional interference measurement apparatus.
Figure 12:
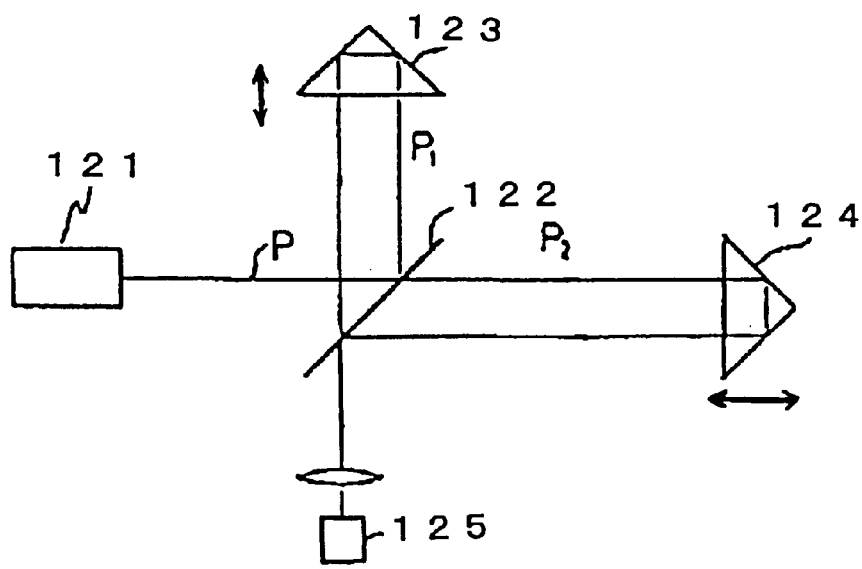
FIG. 12 shows a conventional bulk type phase modulation interference measurement apparatus.

Next, an example of a system constitutional view of the interference measurement apparatus is shown in FIG. 10.

In this system, provided are a light source section 101, a waveguide module 102, an interference section 103, a measurement reflection section 104, a control section 105, a driving section 106, a stage 107 and an objective 108. In FIG. 10, double lines and one thick lines are an electrical signal line and an optical fiber line, respectively.

The light source section 101 is constituted by a laser diode or the like, which emits a coherent light. Moreover, in the light source section 101, a lens and an isolator can be properly provided for making a connection with an optical fiber. The waveguide module 102 comprises an optical waveguide section and an irradiation section. The waveguide module 102 is applied with a modulation voltage, receives a coherent light from the light source section 101 and emits the irradiation luminous flux. The interference section 103 comprises a polarization beam splitter section, a reference reflection section, ¼ wave plates on a reference optical path and a measurement optical path, and a polarization member. Moreover, a connector section for making a connection with the optical fiber is included therein. The measurement reflection section 104 is provided in a portion for measuring the displacement of the objective 108.

The control section 105 has a constitution which controls the driving section 106 as well as the light receiving section and the displacement measurement section. The driving section 106 can allow the stage 107 to change its position in accordance with an input signal. On the stage 107, the objective 108 is mounted or placed.

According to the present invention, the displacement of the objective can be measured only by placing the measurement reflection section 104 on the stage in such a system. Application examples of the system are, for example, a semiconductor manufacturing apparatus, a precision measurement/positioning system which can be mounted on precision measurement instruments. According to the present data, in an example of a precision positioning/controlling system referencing a laser wavelength, for example, a resolving power was about 0.1 nm, a measurement precision was below about 1 ppm, and a maximum response speed was about 200 mm/sec. However, this embodiment is not limited to these values. Noted that the second embodiment of the present invention can be applied to this system.

Although the preferred embodiments of the present invention have been described in detail, it should be understood that various changes, substitutions and alternations can be made therein without departing from spirit and scope of the inventions as defined by the appended claims.

The contents of the Japanese patent application No.9-314586 filed Oct. 31, 1997 including specification, claims and drawings are incorporated herein by reference.

What is claimed is:

1. An interference measurement apparatus comprising:
   a light source section for supplying a linearly polarized light;
   an optical waveguide section having a phase modulation section provided therein, which gives different phases to TM and TE modes of a incidence luminous flux by a predetermined modulation frequency, the optical waveguide section receiving a luminous flux from said light source section and emitting a phase modulation luminous flux;
   a beam splitter section which separates the phase modulation luminous flux subjected to the phase modulation by said optical waveguide section into a measurement luminous flux and a reference luminous flux depending on each polarization direction, and allows the measurement luminous flux to travel to a measurement optical path where a measurement objective is arranged and the reference luminous flux to travel to a reference optical path where a reference reflection section is arranged;

a light receiving section which receives an interference luminous flux obtained by interfering the reference luminous flux and the measurement luminous flux, the reference luminous flux returning from the reference optical path via said beam splitter section and the measurement luminous flux returning from the measurement optical path via said beam splitter section; and a displacement measurement section which extracts a frequency component, phases of which are shifted by 90° from each other, from said light receiving section, and measures a displacement of the objective based on the extracted signal.

2. The interference measurement apparatus according to claim 1, further comprising:

a first ¼ wave plate and a reference plane mirror disposed on the reference optical path;

a second ¼ wave plate disposed on the measurement optical path;

a measurement plane mirror disposed on the measurement objective in the measurement optical path; and a polarization member which allows a reflection luminous flux from said measurement plane mirror and a reflection luminous flux from said reference plane mirror to interfere with each other, wherein said beam splitter section is formed of a polarization beam splitter and directs the reflection luminous flux reflected by said reference plane mirror and the reflection luminous flux reflected by said measurement plane mirror to said light receiving section via said polarization member.

3. The interference measurement apparatus according to claim 1, wherein said optical waveguide section is formed of a substrate exhibiting an electro-optic effect, and a linearly polarized light from said light source section is incident into the substrate so that a polarization direction thereof is approximately 45° relative to a surface of the substrate, and a signal for a predetermined modulation frequency is applied to said phase modulation section of said optical waveguide section, thereby allowing the TM and TE modes of the incidence luminous flux to perform phase changes of approximately equal amplitude and opposite signs to each other.

4. The interference measurement apparatus according to claim 1, wherein said optical waveguide section is formed of a lithium niobic acid crystal substrate or a lithium tantalate crystal substrate which is X-cut and Z-propagation type, and said phase modulation section of said optical waveguide section is applied with an electric field by a modulation frequency in a Y-direction.

5. The interference measurement apparatus according to claim 1, wherein said optical waveguide section is connected to said light source section by a fiber for maintaining a polarization, and a linearly polarized light from said light source section is incident into the surface of the substrate so that a polarization direction thereof is approximately 45° relative to the surface of the substrate.

6. The interference measurement apparatus according to claim 1, wherein said optical waveguide section is connected to said light source section by a lens and a polarizer, and a coherent light from said light source section is incident into the surface of the substrate so that a polarization direction thereof is approximately 45° relative to the surface of the substrate.

7. The interference measurement apparatus according to claim 1, wherein said phase modulation section includes a pair of electrodes formed near an optical waveguide of said optical waveguide section so that a voltage of a predetermined frequency is applied thereto.

8. The interference measurement apparatus according to claim 7, wherein phase modulation section allows the TM and TE modes of the linearly polarized light to perform phase changes of approximately equal amplitude and opposite signs to each other.

9. The interference measurement apparatus according to claim 1, wherein said optical waveguide section includes an optical guide and wherein said optical waveguide section is adjusted by setting a refractive index of the substrate of said optical waveguide section, a dimension of a pair of electrodes in said phase modulation section or an interval of the electrodes thereof disposed near the optical guide, an applied voltage to said phase modulation section, or combinations of them, so that the TM and TE modes of the phase modulation luminous flux modulated have approximately the same amplitude or a polarized light on the surface of the substrate and a polarized light on a plane perpendicular to the surface of the substrate have approximately the same amplitude.

10. The interference measurement apparatus according to claim 1, wherein said displacement measurement section comprises:

a signal extraction section which extracts, among output signals of said light receiving section, a fundamental wave signal having a frequency equal to a modulation frequency of said phase modulation section and a double wave signal having a frequency twice that of the fundamental wave signal; and a displacement measurement section which obtains a displacement of the measurement objective from phases of the signals extracted by said signal extraction section.

11. An interference measurement apparatus comprising:

a light source section for supplying a linearly polarized light;

an optical waveguide section having a phase modulation section provided therein, which gives predetermined different phases to TM and TE modes of an incidence luminous flux by a predetermined modulation frequency signal, the optical waveguide section receiving a luminous flux from said light source section and emitting a phase modulation luminous flux;

a beam splitter section which separates the phase modulation luminous flux subjected to the phase modulation by said optical waveguide section into a measurement luminous flux and a reference luminous flux depending on each polarization direction, and allows the measurement luminous flux to travel to a measurement optical path where a measurement objective is arranged and the reference luminous flux to travel to a reference optical path where a reference reflection section is arranged;

a light receiving section which receives an interference luminous flux obtained by interfering the reference luminous flux and the measurement luminous flux, the reference luminous flux returning from the reference optical path via said beam splitter section and the measurement luminous flux returning from the measurement optical path via said beam splitter section; and a displacement measurement section which extracts a frequency component, phases of which are shifted by 90° from each other, from said light receiving section, and measures a displacement of the objective based on the extracted signal.

12. The interference measurement apparatus according to claim 11, further comprising:

a first ¼ wave plate and a reference plane mirror disposed on the reference optical path;

a second ¼ wave plate disposed on the measurement optical path;

a measurement plane mirror disposed on the measurement objective in the measurement optical path; and a polarization member which allows a reflection luminous flux from said measurement plane mirror and a reflection luminous flux from said reference plane mirror to interfere with each other, wherein said beam splitter section is formed of a polarization beam splitter and directs the reflection luminous flux reflected by said reference plane mirror and the reflection luminous flux reflected by said measurement plane mirror to said light receiving section via said polarization member.

13. The interference measurement apparatus according to claim 11, wherein said optical waveguide section is formed of a substrate exhibiting an electro-optic effect, and a linearly polarized light from said light source section is incident into the substrate so that a polarization direction thereof is approximately 45° relative to a surface of the substrate, and a signal for a predetermined modulation frequency is applied to said phase modulation section of said optical waveguide section, thereby allowing the TM and TE modes of the incidence luminous flux to perform phase changes of approximately equal amplitude and opposite signs to each other.

14. The interference measurement apparatus according to claim 11, wherein said optical waveguide section is formed of a lithium niobic acid crystal substrate or a lithium tantalate crystal substrate which is X-cut and Z-propagation type, and said phase modulation section of said optical waveguide section is applied with an electric field by a modulation frequency in a Y-direction.

15. The interference measurement apparatus according to claim 11, wherein said optical waveguide section is connected to said light source section by a fiber for maintaining a polarization, and a linearly polarized light from said light source section is incident into the surface of the substrate so that a polarization direction thereof is approximately 45° relative to the surface of the substrate.

16. The interference measurement apparatus according to claim 11, wherein said optical waveguide section is connected to said light source section by a lens and a polarizer, and a coherent light from said light source section is incident into the surface of the substrate so that a polarization direction thereof is approximately 45° relative to the surface of the substrate.

17. The interference measurement apparatus according to claim 11, wherein said phase modulation section includes a pair of electrodes formed near an optical waveguide of said optical waveguide section so that a voltage of a predetermined frequency is applied thereto.

18. The interference measurement apparatus according to claim 17, wherein phase modulation section allows the TM and TE modes of the linearly polarized light to perform phase changes of approximately equal amplitude and opposite signs to each other.

19. The interference measurement apparatus according to claim 11, wherein said optical waveguide section includes an optical guide and wherein said optical waveguide section is adjusted by setting a refractive index of the substrate of said optical waveguide section, a dimension of a pair of electrodes in said phase modulation section or an interval of the electrodes thereof disposed near the optical guide, an applied voltage to said phase modulation section, or combinations of them, so that the TM and TE modes of the phase modulation luminous flux modulated have approximately the same amplitude or a polarized light on the surface of the substrate and a polarized light on a plane perpendicular to the surface of the substrate have approximately the same amplitude.

20. The interference measurement apparatus according to claim 11, wherein said displacement measurement section comprises:

a signal extraction section which extracts, among output signals of said light receiving section, a fundamental wave signal having a frequency equal to a modulation frequency of said phase modulation section and a double wave signal having a frequency twice that of the fundamental wave signal; and a displacement measurement section which obtains a displacement of the measurement objective from phases of the signals extracted by said signal extraction section.

* * * * *